US009688325B2

United States Patent
Hakes et al.

(10) Patent No.: US 9,688,325 B2
(45) Date of Patent: Jun. 27, 2017

(54) UNDERCARRIAGE ASSEMBLY AND TRACK LINKS FOR ASSEMBLY

(71) Applicant: Caterpillar Inc., Peoria, IL (US)

(72) Inventors: David Hakes, Brimfield, IL (US); Tom Oertley, Peoria, IL (US); Jason R. Beckerdite, Morton, IL (US); Benoit Abello, Dunlap, IL (US); Thomas Ellmann, Groveland, IL (US); Thomas J. Kowalski, Franklin, WI (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/839,240

(22) Filed: Aug. 28, 2015

(65) Prior Publication Data

US 2017/0057574 A1    Mar. 2, 2017

(51) Int. Cl.
*B62D 55/12* (2006.01)
*B62D 55/21* (2006.01)
*B62D 55/20* (2006.01)
*B62D 55/14* (2006.01)

(52) U.S. Cl.
CPC ............. *B62D 55/21* (2013.01); *B62D 55/14* (2013.01); *B62D 55/202* (2013.01)

(58) Field of Classification Search
CPC ....... B62D 55/21; B62D 55/14; B62D 55/202
See application file for complete search history.

(56) References Cited

U.S. PATENT DOCUMENTS

| | | | |
|---|---|---|---|
| 6,543,863 B1 | 4/2003 | Hannan et al. | |
| 7,530,650 B2 | 5/2009 | Hannan et al. | |
| 7,594,705 B2 | 9/2009 | Rutz et al. | |
| 8,272,701 B2 | 9/2012 | Mulligan | |
| 8,511,760 B2 | 8/2013 | Simula et al. | |
| 2005/0035655 A1* | 2/2005 | Beckstrom | B62D 55/112 305/173 |
| 2006/0181151 A1* | 8/2006 | Wodrich | B62D 55/15 305/201 |
| 2008/0179946 A1 | 7/2008 | Oertley | |
| 2014/0126985 A1 | 5/2014 | Yaunke et al. | |
| 2014/0152086 A1 | 6/2014 | Meyer et al. | |
| 2014/0292068 A1 | 10/2014 | Hisamatsu et al. | |

(Continued)

FOREIGN PATENT DOCUMENTS

DE    202015002177    4/2015
EP    0058520    8/1982

(Continued)

*Primary Examiner* — Kevin Hurley
*Assistant Examiner* — Gabriela C Craciun
(74) *Attorney, Agent, or Firm* — Leydig, Voit & Mayer, LTD.

(57) ABSTRACT

An undercarriage assembly for a mobile machine includes a continuous track having a plurality of mated track links that can translate with respect to the machine. Each track link may include a shoe portion and a body portion. The body portion includes a plurality of projecting pin lugs each having a pin bore to receive a bin and link adjacent track links together. The pin lugs can include a pair of sprocket lugs for making rolling contact with a sprocket, a pair of roller lugs for making rolling contact with a plurality of rollers, and a side lug having a protruding shoulder to assist in aligning the plurality of rollers.

20 Claims, 5 Drawing Sheets

(56) References Cited

U.S. PATENT DOCUMENTS

| | | | |
|---|---|---|---|
| 2014/0346856 A1* | 11/2014 | Colwell | B62D 55/26 |
| | | | 305/185 |
| 2015/0008730 A1 | 1/2015 | Steiner et al. | |
| 2015/0158536 A1* | 6/2015 | Takagi | B62D 55/12 |
| | | | 305/201 |
| 2015/0197295 A1* | 7/2015 | Feng | B62D 55/21 |
| | | | 305/202 |
| 2015/0344088 A1* | 12/2015 | Hakes | B62D 55/14 |
| | | | 305/137 |
| 2015/0353152 A1* | 12/2015 | Hakes | B62D 55/20 |
| | | | 305/15 |
| 2015/0375813 A1* | 12/2015 | Talbot | B62D 55/202 |
| | | | 305/198 |
| 2016/0023697 A1* | 1/2016 | Neyer | B62D 55/21 |
| | | | 305/202 |
| 2016/0052570 A1* | 2/2016 | Ellmann | B62D 55/12 |
| | | | 305/142 |
| 2016/0052571 A1* | 2/2016 | Ellmann | B62D 55/125 |
| | | | 305/142 |
| 2016/0068204 A1* | 3/2016 | Rathod | B62D 55/0887 |
| | | | 277/352 |
| 2016/0185404 A1* | 6/2016 | Westoby | B62D 55/14 |
| | | | 305/201 |

FOREIGN PATENT DOCUMENTS

| | | |
|---|---|---|
| JP | H07187030 | 7/1995 |
| JP | 2007-326554 A | 12/2007 |
| WO | WO 2014/027530 A1 | 2/2014 |

\* cited by examiner

UNDERCARRIAGE ASSEMBLY AND TRACK LINKS FOR ASSEMBLY

TECHNICAL FIELD

This patent disclosure relates generally to undercarriage assemblies for mobile machines and, more particularly, to a continuous track and the individual track links used with such undercarriage assemblies.

BACKGROUND

Many mobile machines used in mining, construction, agriculture, and the like are supported on an undercarriage assembly that may have one or more continuous tracks or caterpillar tracks that enable the machine to traverse the ground or terrain. The continuous track may include a plurality of track links that are pivotally linked together by pins, for example, and that are arranged in a continuous loop or belt similar to a closed chain. Each track link also includes a shoe or track pad disposed to the outside of the loop of the continuous track that engages the ground. The continuous track is disposed around a plurality of wheels or rollers, sometimes referred to as a bogie, arranged along a lower side of the machine and the track can be made to translate about the wheels or rollers with respect to the machine by a drive sprocket operatively coupled to the prime mover. The hinged connection between the individual track links enables the continuous track to flex and bend as it moves in a loop about the plurality of rollers.

An advantage of continuous tracks is that they can better support and distribute the weight of the machine due to the fact the continuous track provides a larger degree of surface contact with the ground and thus better traction, as compared with other forms of propulsion such as pneumatic tires or wheels. Accordingly, continuous tracks can better traverse soft or loose soil or other materials without becoming stuck or spinning out. In addition, the better traction means the continuous tracks may have better climbing capability or the ability to ride up and down steep grades in the work surface. Further, because the individual links are often made of steel or hard rubber, the continuous tracks are typically more durable than compared with tires.

The track links themselves are designed to engage the drive sprocket and rollers to transfer the weight of the machine to the ground and assist in translation of the continuous track around the sprocket and rollers. One example of a track link is presented in U.S. Patent Publication 2014/0152086 ("the '086 application"), which describes a continuous track having a plurality of link assemblies aligned together in a row with each link assembly including a pair of individual links arranged in an end-to-end manner. The individual links are linked to each other by pins that extend between them and that interconnect the link assembly with an adjacent link assembly disposed in the row, similar to roller chain. The individual links may include surfaces disposed towards the inside of the loop of the continuous track that, when the links are interconnected, provide continuous paths for rolling engagement with the rollers and which help prevent the track from slipping or being dislocated with respect to the rollers. The present application is also directed to the engagement between the track links and rolling components of an undercarriage assembly.

SUMMARY

The disclosure describes, in one aspect, a track link for a continuous track that includes a link body and a shoe portion. The link body extends between a first body side and a second body side and delineates a width axis corresponding to a width of the link body. A drive beam is disposed mid-width along the width axis and a plurality of pin lugs having roots are aligned along the width axis. Each pin lug further includes a pin bore that is offset with respect to the width axis. The pin lugs may be of different styles. Particularly, the pin lugs may include a pair of sprocket lugs that are disposed toward either side of the drive beam and that extend perpendicularly in opposite directions from the width axis to the pin bore. The pin lugs may also include a pair of roller lugs that are disposed to either side of the pair of sprocket lugs and that extend perpendicularly in opposite directions from the width axis to the pin bore. The pin lugs may further include a pair of side lugs that disposed to either side of the pair of roller lugs and that extend perpendicularly in opposite directions from the width axis to the pin bore.

In another aspect, the disclosure describes an undercarriage assembly for a mobile machine. The undercarriage assembly includes a track frame having a frame length that extends between a first frame end and a second frame end. A drive sprocket is operatively coupled to a power source and is rotatably supported by the frame proximate the first frame end. A plurality of plurality of rollers are rotatably supported by the track frame and spaced apart between the first frame end and the second frame end. The undercarriage assembly also includes a continuous track disposed around the track frame and that includes a plurality of track links linked together with each other. The track links can include a link body extending between a first body side and a second body side over a shoe portion. The link body may include a drive beam disposed mid-width between the first body side and the second body side that is adapted to engage the drive sprocket. The link body may also include a pair of sprocket lugs that are disposed to either side of the drive beam and that have rail protrusions adapted to make rolling contact with the drive sprocket. The link body may also include a pair of roller lugs that are disposed to either side of the pair of sprocket lugs and that have roller troughs disposed therein that are adapted to make rolling contact with the plurality of rollers. The link bodies additionally may include a pair of side lugs that are disposed to either side of the pair of roller lugs and that have shoulder protrusions protruding above the roller troughs.

In yet a further aspect, the disclosure describe a method of operating a continuous track that includes a plurality of track links having a drive beam, a pair of sprocket lugs, a pair of roller lugs, and a pair of side lugs. According to the method, the continuous track is disposed about a track frame having a double-wheeled roller and a drive sprocket with a plurality of teeth. The drive sprocket is rotated to urge one of the plurality of teeth against the drive beam. Rolling contact occurs between the drive sprocket and a rail protrusion protruding from each of the pair of sprocket lugs. Rolling contact further occurs between the double-wheeled roller along a first roller path and a second roller path corresponding to the pair of roller lugs. The double-wheeled roller and the continuous track are aligned by disposing each wheel of the double-wheeled roller between the rail protrusion protruding from sprocket lugs and a shoulder protrusion protruding from the side lugs.

DETAILED DESCRIPTION

Figure 1:
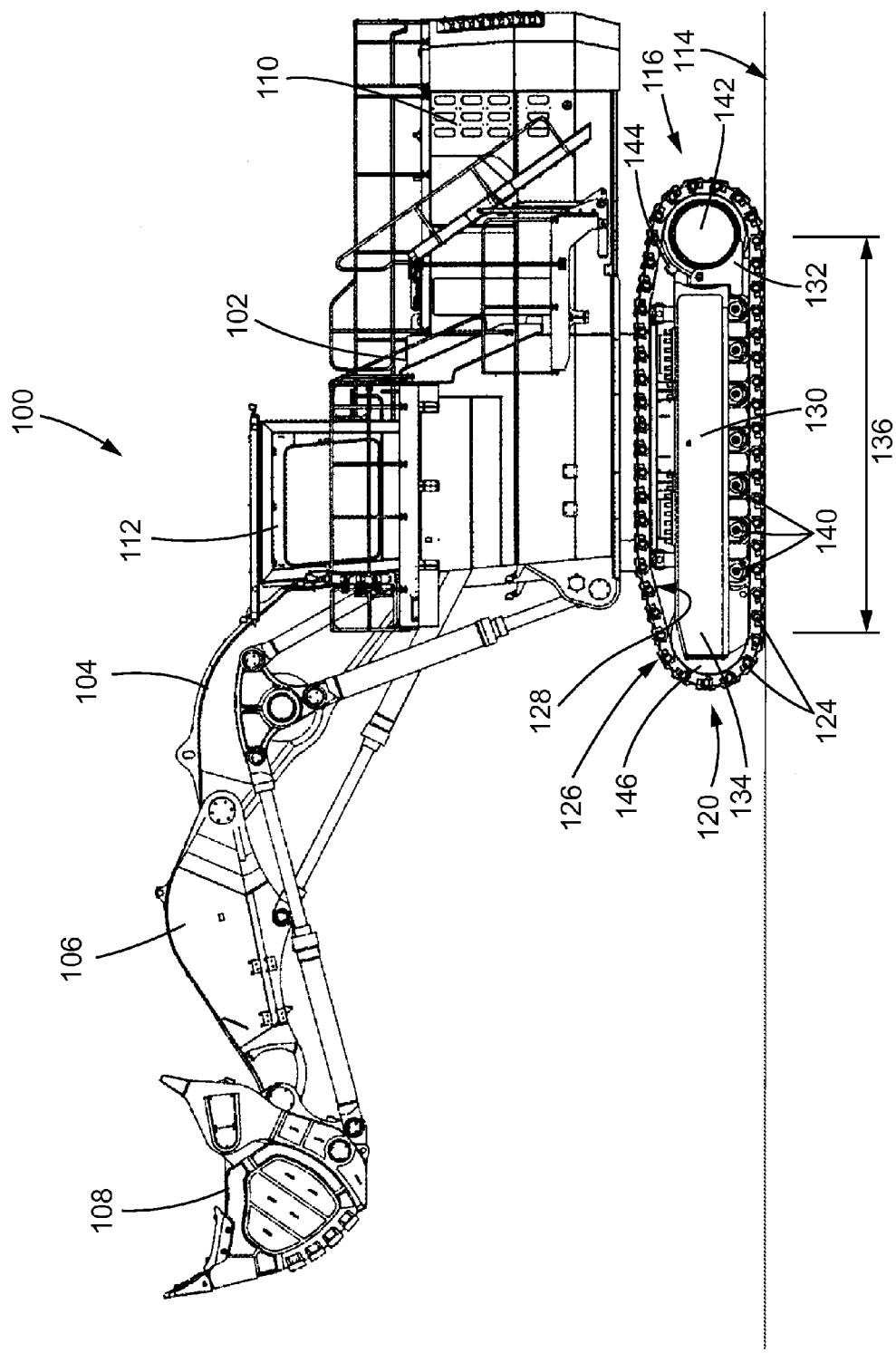
FIG. 1 is a side elevational view of a mobile machine in the form of a hydraulic shovel used for mining operations and the like which is supported on an undercarriage assembly having continuous tracks that can traverse over the ground or terrain.

This disclosure relates to machine including an undercarriage assembly having continuous tracks for traversing the ground or terrain about a work site. Now referring to the drawings, wherein like reference numbers refer to like elements, there is illustrated a machine 100 of such a type which, in particular, may be a hydraulic shovel or power shovel. However, the present disclosure is applicable to any type of machine having an undercarriage assembly and that performs some type of operation associated with an industry such as mining, construction, farming, transportation, or any other industry known in the art. For example, the machine may be an earth-moving machine, such as a track loader, excavator, continuous miner, material handler, track-type tractor, highwall miner, rotary blasthole drill, or the like. Moreover, an implement may be connected to the machine. Such implements may be utilized for a variety of tasks, including, for example, loading, compacting, lifting, drilling, brushing, and include, for example, buckets, compactors, forked lifting devices, brushes, grapples, cutters, shears, blades, breakers/hammers, augers, and others.

The machine 100 embodied as a hydraulic shovel may be intended for digging, lifting, and dumping material about a worksite such as a mine and can include a machine frame 102 or chassis to which a hydraulically operated boom 104 and stick 106 are connected in an articulating manner. Disposed at the end of the stick 106 is a bucket 108 configured to dig or scoop material and move the material to another location when the boom 104 and stick 106 are moved with respect to the frame 102. In addition to or instead of hydraulics, the boom 104 and bucket 108 can be supported and moved by a rope or cable system. To provide power for manipulating the boom 104 and stick 106 and the other operations of the machine 100, a power plant 110, such as an internal combustion engine, can be disposed on the frame 102 behind vented panels attached to the frame. The power plant 110 can combust a hydrocarbon-based fuel such as diesel to convert the chemical energy therein into mechanical power and motion that can be harnessed by the other systems on the machine 100. To accommodate an operator who may control the operation of the machine, an operator's cab 112 can be disposed on top of the frame 102 in a position providing visibility about the worksite and inside of which various machine motion controls, power plant controls, gauges, and readouts are located.

To facilitate digging and loading operations, the frame 102 of the machine 100 can be pivotally mounted on an undercarriage 116 such that the frame 102 can swing the boom 104 and stick 106 around for loading or dumping loads from the bucket 108. To propel the machine 100 over the ground or surface 114 of the worksite, the undercarriage 116 can be equipped with a plurality of continuous tracks 120. While the illustrated view shows only one continuous track 120 on one side of the machine 100, it will be appreciated that a second, generally identical track is disposed on the other side. In a further embodiment, multiple continuous tracks can be provided on each side of the machine. The continuous track 120, which may also be referred to as a caterpillar track, crawler track, or endless loop track, includes a plurality of track links 122 that are arranged in an end-to-end manner and are linked together to form a loop or closed belt. Moreover, pins 124 or pin cartridges are used to join or link the track links 122 to each other so that adjacent track links are able to pivot or articulate with respect to each other and the continuous track 120 is flexible in a manner similar to a roller chain. When arranged as a loop, the continuous track 120 can be considered as having an outer periphery 126 directed outwardly of the loop, an inner periphery 128 directed inwardly, and has a continuous length measured as one complete revolution of the loop.

The continuous track 120 can be disposed as a band or loop that is wrapped about a track frame 130 of the undercarriage 116, which extends between a first frame end 132 and a second frame end 134 that accordingly delineate a frame length 136. In the embodiment where the machine 100 is a hydraulic shovel, the frame length 136 may be about 9.1 meters and the continuous track may have a height of approximately 2.5 meters. The track frame 130 can be arranged generally horizontally and parallel with respect to the surface 114 so that a lower portion of the continuous track 120 is in contact with the surface 114 while another portion is directed upwards and away from the surface 114. While the terms "lower," "upper" and the like are used in the description for orientation and reference purposes, it should be noted they are not intended as a limitation on the claims unless explicitly stated and described otherwise. When the continuous track 120 is disposed about the track frame 130, it can generally encircle the track frame 130 around the frame length 136 between the first frame end 132 and the second frame end 134.

The continuous track 120 can be made to translate about the track frame 130 so that the machine 100 moves over the surface 114. To enable the continuous track 120 to translate with respect to the track frame 130, the track frame can include a plurality of wheels or rollers of different configurations that direct and guide the track about the frame. For example, the track frame 130 can include a plurality of rollers 140 that are rotatably disposed along a bottom of the track frame and that are spaced apart with respect to the frame length 136. The rollers 140 can make rolling contact with the inner periphery 128 of the continuous track 120 so that the weight of the machine 100 transfers through the rollers to the surface 114 as the track moves underneath the rollers. In addition to the lower rollers 140, in an embodiment, undercarriage assembly 116 the track assembly may also include upper rollers to guide the continuous track overhead. To drive the continuous track 120 about the track frame 130, a drive sprocket 142 can be rotatably disposed at the first frame end 132 and is operably coupled with the power plant 110 to receive motive power. The drive sprocket 142 is a wheel-like structure having a plurality of drive teeth 144 protruding radially therefrom that can engage with the track links 122 in the manner described below. Further, the drive sprocket 142 can be reversibly coupled with the power plant 110 so that it can selectively translate the continuous track in either a clockwise or counter-clockwise direction. To maintain tension across the continuous track 120, the track frame 130 can also include wheel-like idler 146 rotatably disposed at the second frame end 134 that is in rolling contact with the inner periphery 128. In an embodiment, the rollers 140, drive sprocket 142, and/or the idler 146 can be supported on a suspension system to improve traction and enable smooth motion of the machine over the ground. The continuous track 120 wraps and bends around the drive sprocket 142 and the idler 146 that are located at the first and second frame ends 132, 134 respectively to form a closed loop.

Figure 2:
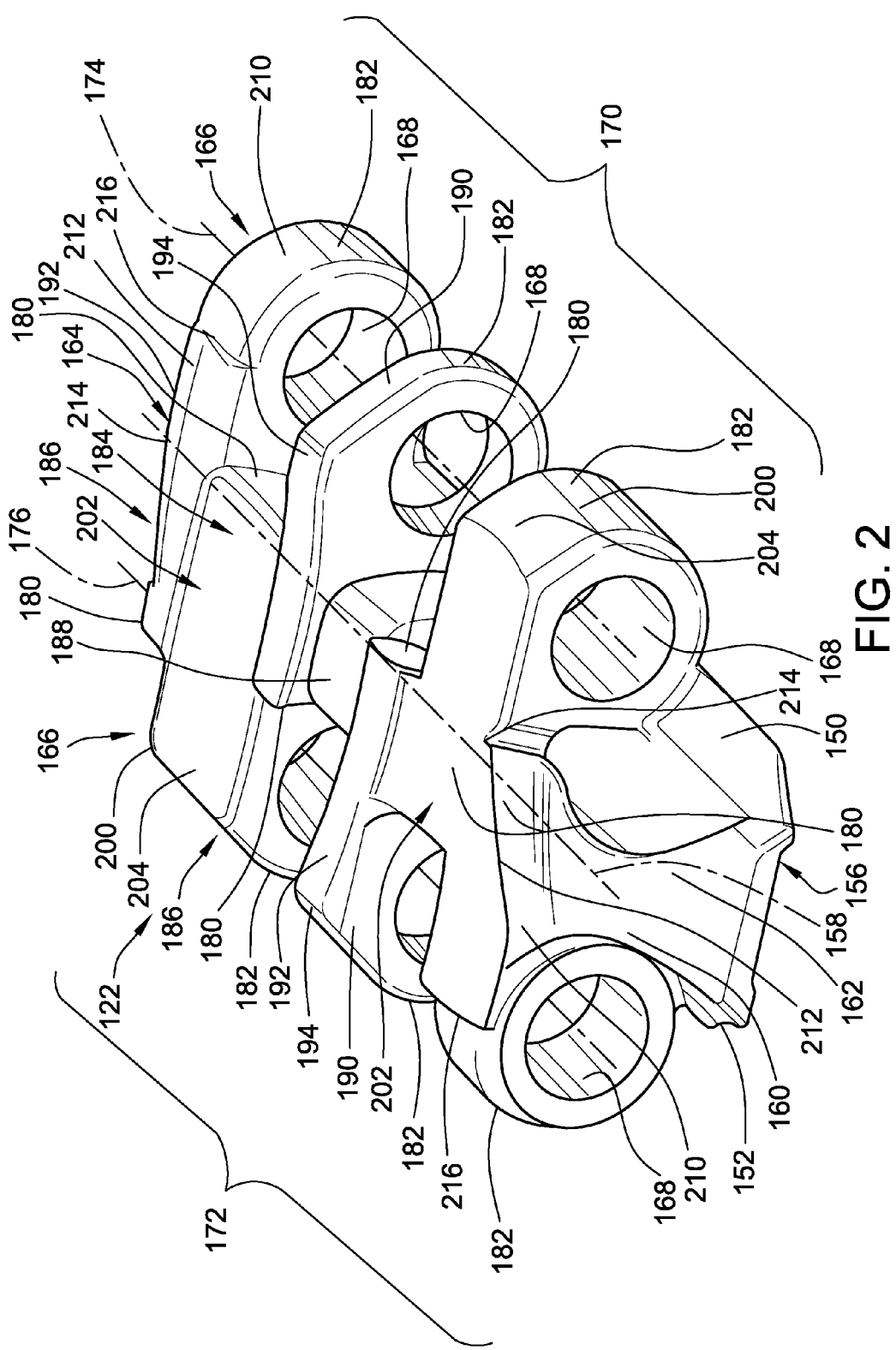
FIG. 2 is a top perspective view of a track link that can be linked with other track links to make up the continuous track, wherein the track link includes a shoe portion for contacting the ground and a contoured upper surface opposite the shoe portion adapted to engage the various rollers and sprockets of the undercarriage assembly.
Figure 3:
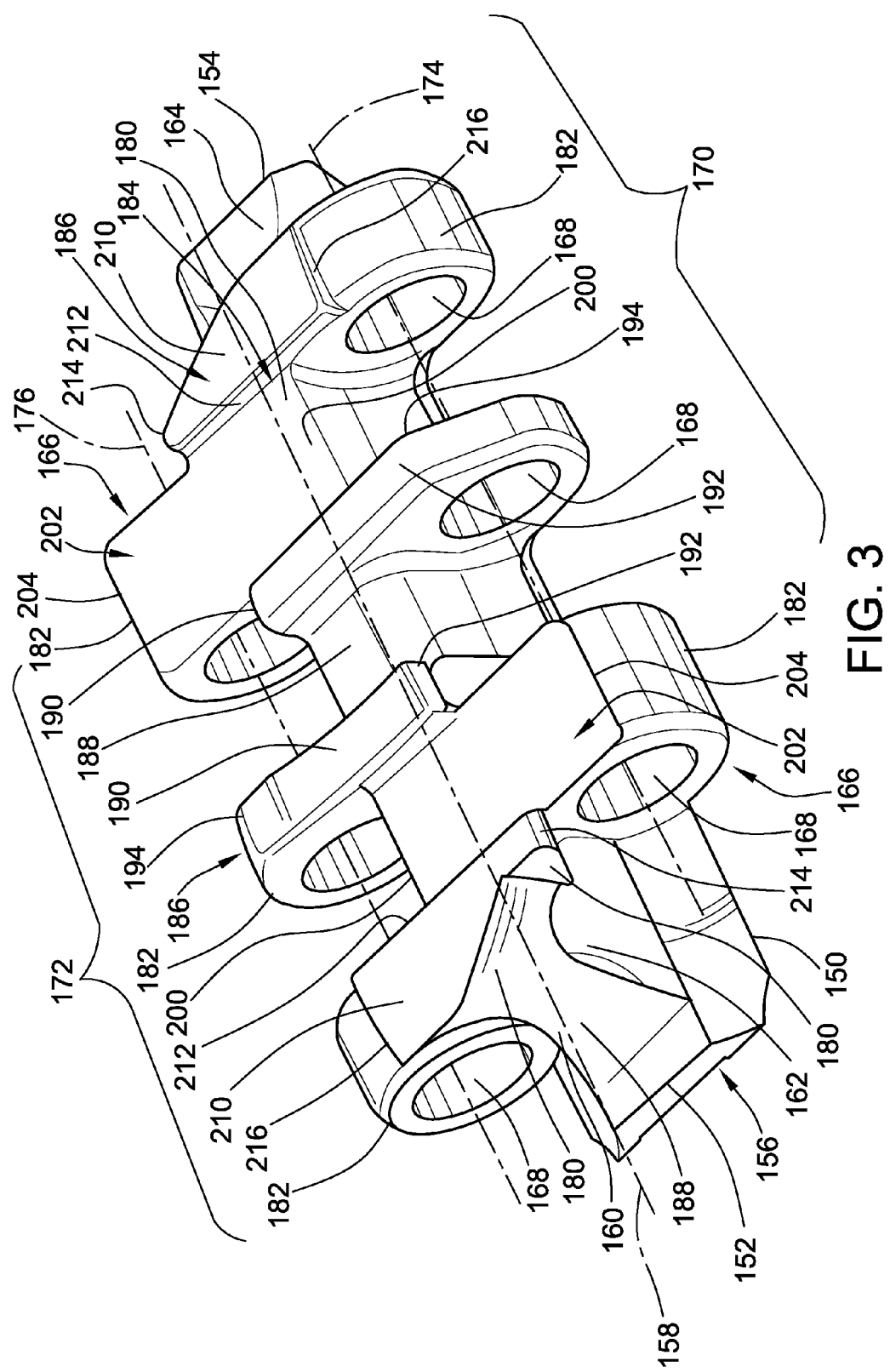
FIG. 3 is a top perspective view of the track link illustrating another view of the contoured upper surface.

Referring to FIGS. 2 and 3, there is illustrated an individual track link 122 independent of the assembly of the continuous track. Each of the individual track links 122 can be generally identical to each other and the following description can apply to all links in the continuous track. The track link 122 can be made from a suitably strong material such as a cast metal. To contact the ground during use, the track link 122 may include a shoe portion 150 that extends from a first shoe side 152 to a second shoe side 154 and that delineates a planar lower surface 156 that can have a generally rectangular outline. When the track links 122 assembled into the loop of the continuous track 120, the planar lower surface 156 can correspond to the outer periphery of the continuous track with the rectangular shape being oriented perpendicular to the length of the track. The first shoe side 152 and the second shoe side 154 are oriented with the narrower edges of the rectangular outline and thereby delineate a centrally disposed width axis 158 corresponding to the width of the track link 122. In other embodiments, however, it should be appreciated that the shoe portion 150 may have a shape other than strictly rectangular. Although the planar lower surface 156 is unencumbered in the illustrated embodiment, in other embodiments it may include pads, crimps, tangs, and the like to improve traction by digging into the ground or terrain.

To link with adjacent links, the track link 122 may include a link body 160 that protrudes above and that extends along the shoe portion 150. In the illustrated embodiment, the shoe portion 150 and the link body 160 may be cast integrally with each other but in other embodiments they may be attached together by fasteners or the like. The link body 160 may includes a first body side 162 and a second body side 164 that correspond in orientation to the first shoe side 152 and the second shoe side 154. The first body side 162 and the second body side 164 can be oriented toward opposite ends of the width axis 158 so that the major extension of the track link 122 is oriented parallel to the width axis. To accommodate pins for linking with other track links, the link body 160 can include a plurality of pin lugs 166, each of which includes a circular pin bore 168 for receiving a pin. The pin lugs 166 are further arranged in a first array 170 of pin lugs and a second array 172 of pin lugs. The first array 170 of pin lugs 166 and the second array 172 of pin lugs protrude or project perpendicularly with respect to the width axis 158 in opposite directions of each other. Hence, the pin bores 168 of the first array 170 are aligned along a first array axis 174 and the pin bores of the second array 172 are aligned along a second array axis 176, both of which are parallel to and offset from the width axis 158.

The pin lugs 166 of the first array 170 and of the second array 172 can be arranged in a staggered, alternating manner so that the lugs of each array alternate with respect to each other. Each pin lug 166 can include a root 180 that is proximate to or aligned along the width axis 158 and a distal edge 182 that projects freely outward from the width axis 158. The distal edge 182 may be curved and generally corresponds to the outline of the offset pin bores 168 disposed in each of the pin lugs 166. By projecting the pin lugs 166 of the first and second arrays 170, 172 in opposing directions with respect to the width axis 158, the roots 180 of the staggered first and second arrays 170, 172 are adjacent to and contiguous with each other while the distal edges 182 are freely spaced apart and the pin bores 168 can be accessed more easily. The link body 160 therefore delineates a contiguous spine 184 integrally joining the roots 180 of the plurality of pin lugs 166 together and extending between the first body side 162 and the second body side 164 that aligns with the width axis 158 and extends across the shoe portion 150.

To engage the rollers, drive sprocket, and other components of the track frame, the link body 160 can delineate a contoured upper surface 186, located opposite of the planer lower surface 156 of the shoe portion 150, which is shaped to facilitate rolling contact with those track frame components. In particular, the pin lugs 166 of the link body 160 can be further arranged into particular styles of lugs that can guide and direct the rolling components of the track frame. For example, the link body 160 can include a drive beam 188 disposed mid-width along the width axis 158 approximately mid-way between the first body side 162 and the second body side 164, which forms part of the contiguous spine 184 of the track link 122. The drive beam 188 can have a beam-like shape with rounded corners that run parallel to the width axis 158. Further, by being associated with the contiguous spine 184, the centrally located drive beam 188 can be generally set within and aligned with the adjacently positioned contiguous roots 180 of the pin lugs 166.

Disposed toward either the first body side 162 or the second body side 164 with respect to the drive beam 188 may be a sprocket lug 190 such that the link body 160 includes a pair of sprocket lugs. The sprocket lugs 190 may be joined at their respective roots 180 to the drive beam 188 which can become part of the contiguous spine 184. The sprocket lugs 190 on either side of the drive beam 188 can extend in opposing directions of each other with respect to the width axis 158 so that one sprocket lug is associated with the first array 170 and the other is associated with the second array 172. Each of the sprocket lugs 190 can include a rib-like rail protrusion 192 projecting from the top surface of the respective sprocket lug above the drive beam 188 so that the drive beam is located below the rail protrusions. The rail protrusions 192 run along the sprocket lugs 190 from the root 180 toward the distal edge 182 perpendicularly with respect to the width axis 158 and form or provide part of the shape of the contoured upper surface 186. Further, the rail protrusions 192 can continue curving upwards as the sprocket lug 190 extends from the root 180 so that the rail protrusions form a peak or crest 194 proximate the distal edge 182 and that is located generally above the pin bore 168 of the respective sprocket lug 190.

Disposed adjacently to either of the sprocket lugs 190, on the opposite side of the drive beam 188, can be a roller lug 200 so that the link body 160 includes a pair of such roller lugs. Like the sprocket lugs 190, the pair roller lugs 200 extend or project in opposite directions of each other perpendicularly with respect to the width axis 158. Hence, each of the roller lugs 200 can be associated with one of the first array 170 or the second array 172. The roller lugs 200 may be generally wider than the sprocket lugs 190. Further, the top surface of the roller lugs 200, corresponding to the contoured upper surface 186, may delineate a roller trough 202 that is extends down with respect to the contoured upper surface 186 for engaging in rolling contact with a roller. In particular, the roller troughs 202 may have a curved or arcuate shape 204 of a substantial radius that is depressed widthwise into the roller lug 200 and that extends from the root 180 toward the distal edge 182 approximately above the pin bore 168. The arcuate shape 204 causes the roller trough 202 to curve downward with respect to the rail protrusion 192 of the sprocket lug 190 so that the roller trough is generally disposed below the rail protrusion.

Disposed adjacent to either of the roller lugs 200, on the opposite side of the respective sprocket lugs 190, can be one of a pair of side lugs 210 that also correspond in position to the first body side 162 or the second body side 164 of the link body 160. The side lugs 210 also extend in opposite directions perpendicularly from the width axis 158. In an embodiment, the side lugs 210 can include a shoulder protrusion 212 extending from the root 180 toward the distal edge 182 that projects upwards particularly with respect to the roller trough 202 and that corresponds to the contoured upper surface 186. Hence, the arcuate shape 204 of the roller trough 202 curves downward between the rail protrusion 192 and the shoulder protrusion 212 such that the roller trough 202 is generally disposed down between the sprocket lug 190 and the side lug 210. Further, the shoulder protrusion 212 of the side lug 210 can have a narrow shoulder width 214 proximate the root 180 that expands or increases in width to a large shoulder width 216 proximate the distal edge 182 approximately above the pin bore 168.

Because of the staggered, alternating arrangement of the pin lugs 166 and the opposing directions that pin lugs of the same style project with respect to the width axis 158, the first array 170 of pin lugs and the second array 172 of pin lugs each includes one pin lug 166 of the same style, i.e., each array includes a sprocket lug 190, a roller lug 200, and a side lug 210. Furthermore, each pair of pins lugs 166 of the same style are disposed toward the opposite first and second body side 162, 164 of the link body 160 with the sprocket lugs 190 disposed to either side of the drive beam 188, the roller lugs 200 disposed outside the sprocket lugs 190, and the side lugs 210 corresponding to the first and second body sides 162, 164. As will be explained below, this arrangement enables the identical track links 122 to mate and link together to form the continuous track. Furthermore, because the drive beam 188 that corresponds in alignment with the contiguous spine 184 and therefore is generally retracted or recessed with respect to the pin lugs 166 projecting in opposing directions, the drive beam can forcibly engage with the rotating drive sprocket.

Figure 4:
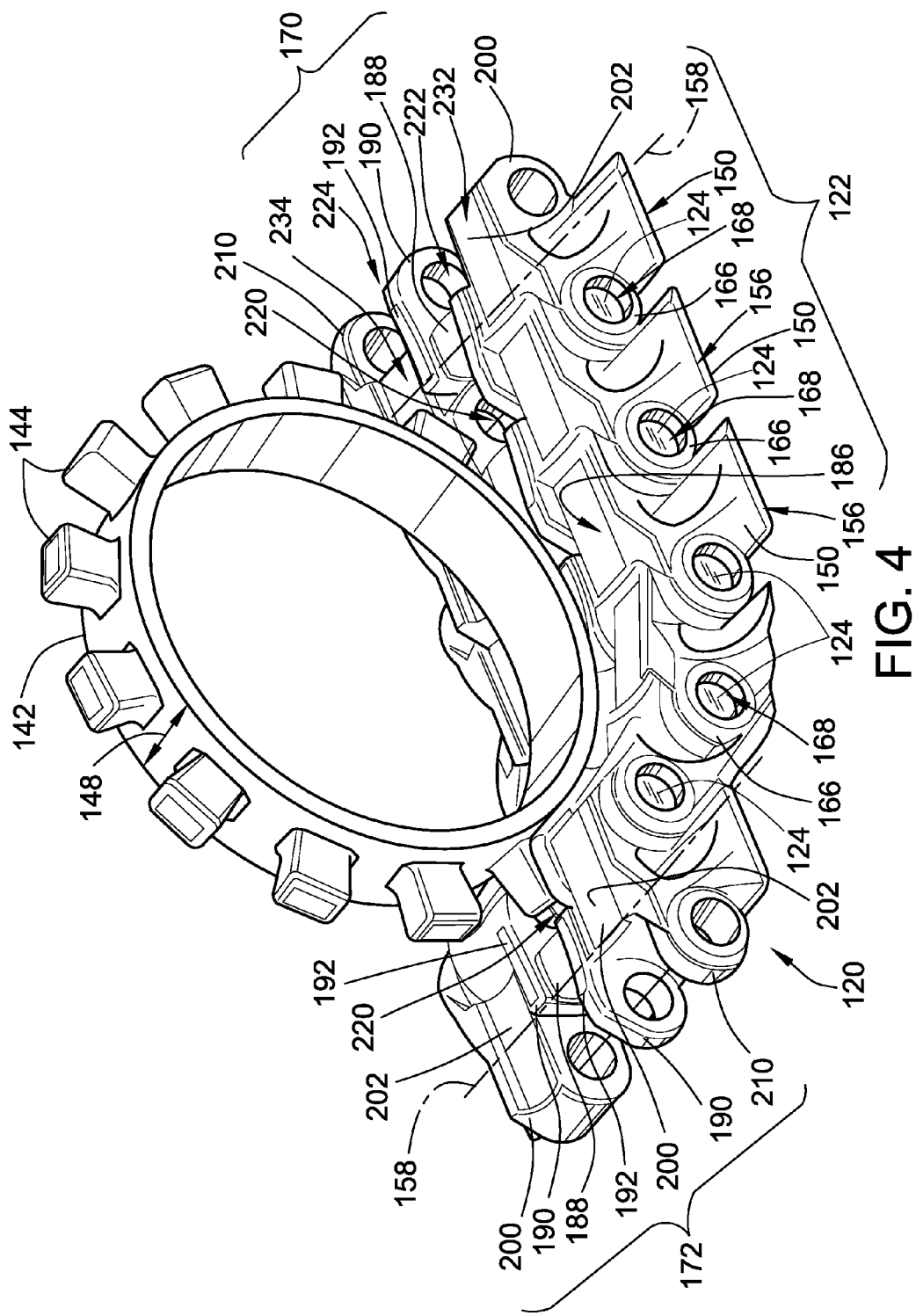
FIG. 4 is a perspective view of a plurality of track links linked together as part of the continuous track and engaging a drive sprocket of the undercarriage assembly.

Referring to FIG. 4, there is illustrated several identical track links 122 that are linked or linked together end-to-end by pins 124 to form a portion of the continuous track 120. To link two track links 122 together, the two track links are placed adjacent to each other with their width axes 158 parallel and the first array 170 of pin lugs 166 of the first track link 122 are appositionally faced towards the second array 172 of pin lugs of the adjacent track link 122. The two adjacent track links 122 are moved together so that the pin lugs 166 of the first array 170 are received between the pin lugs of the facing second array 172, thereby mating the first and second arrays. In particular, the roller lug 200 of the first array 170 of one track link 122 is received between the spaced apart sprocket lug 190 and the side lug 210 of the second array 172 of the adjacent track link 122. Moreover, the pin bores 168 disposed into the pin lugs 166 of the mated first and second arrays 170, 172 can align with each other so that elongated, cylindrical pins 124 can be inserted through the pin bores linking the adjacent track links together. The pins 124 disposed in the pin bores 168 of the mated first and second track arrays 170, 172 form a hinge-like joint that enables the adjacent track links 122 to pivot and articulate with respect to each other.

In an embodiment, two pins 124 can be used to link an adjacent pair of track links 122 with one pin inserted through the pin bore 168 of each roller lug 200 associated with one array that has been received between the sprocket lug 190 and the side lug 210 of the other array. Hence, there are two pins 124 located at the interface of each set of mating first and second arrays 170, 172. Furthermore, while pins 124 may be inserted in the pin bores 168 disposed through the pin lugs 166 toward either side of the track link 122, pins may be absent at the mid-width location, located approximately mid-way with respect to the width axis 158, that corresponds to the location of the drive beam 188. As described below, this provides a plurality of centrally disposed track gaps 220 in the continuous track that alternate with the drive beams 188.

When the adjacent track links 122 are linked together, the pin lugs 166 of the same style and associated with the same arrays align with each other. For example, the roller lug 200 of the first array 170 of a track link 122 aligns directly with the roller lug 200 in the first array of an adjacent track link. Likewise, the sprocket lug 190 in the first array 170 of a track link 122 aligns directly with the sprocket lug 190 in the first array of an adjacent track link. Hence, each pin lug 166 that projects in the same direction from the plurality of track links 122 with respect to the width axis 158 are aligned together. Further, the rectangular, planar lower surfaces 156 of the shoe portions 150 are aligned in parallel to each other to make continuous contact with the ground as the machine passes over the continuous track.

INDUSTRIAL APPLICABILITY

The disclosed track links are configured to improve rolling engagement between the continuous track and the rotating components of the track frame in the undercarriage assembly in a manner that helps reduce wear and prevent misalignment between the components. For example, referring to FIG. 4, the drive sprocket 142 is centered approximately mid-width with respect to the width axis 158 of the track link 122 and is configured to rotate perpendicularly with respect to the width of the link. The drive sprocket 142 can also have a width or sprocket thickness 148, parallel to its axis of rotation, which allows the drive sprocket to simultaneously contact the two sprocket lugs 190 of an individual track link 122 disposed to either side of the drive beam 188. Hence, the rotating drive sprocket 142 can be in rolling contact with both sprocket lugs 190 on the track link 122, utilizing the raised rail protrusions 192 of the sprocket lugs 190 as tracks or guides that provide a pathway for the drive sprocket with respect to the continuous track 120. This rolling contact along the plurality of track links 122 is further enabled since the sprocket lugs 190 associated with the respective first and second arrays 170, 172 are aligned with the corresponding sprocket lugs of an adjacent track lug. The rail protrusions 192 of the sprocket lugs 190 of the first array 170 can therefore align to provide a first rail row 222 and the rail protrusions of the sprocket lugs on the second array 172 align to provide a second rail row 224. The first rail row 222 and the second rail row 224 both extend along the inner periphery of the continuous length of the track.

The curvature of the rail protrusions 192, from root to peak of the sprocket lugs 190, can also conform or match the diameter of the drive sprocket 142. This improves the rolling contact between the drive sprocket 142 and the track link 122 by increasing the degree of instantaneous contact between the components, and helps guide the continuous track 120 as it bends or wraps around the drive sprocket. Because the sprocket lugs 190 extend in opposing directions with respect to the width axis 158, the duration of contact between the drive sprocket 142 and an individual track link 122 is increased. Increasing the amount and/or duration of contact improves the distribution and transfer of the machine weight and load from the drive sprocket to the continuous track. Improving or spreading the distribution of weight may further result in improved traction between the continuous track and the ground or terrain, and may prolong or extend the operating life of track components. To facilitate rolling contact between the idler and the continuous track, the idler can be designed with the same diameter and thickness as the drive sprocket 142 so that similar engagement occurs between the idler and the sprocket lugs 190.

To transfer force between the rotating drive sprocket 142 and the track link 122, the teeth 144 of the drive sprocket can be arranged to move into contact with and urge against the drive beams 188 of the track links. Specifically, because the centrally disposed drive beams 188 are retracted with respect to the projecting pin lugs 166 and are spaced apart from the drive beams of adjacent track links 122, a track gap 220 is formed between the drive beams of adjacent track links. Further, when a plurality of track links 122 are assembled together in the foregoing manner, an alternating series of drive beams 188 and track gaps 220 is formed into the continuous track generally along a centerline or the mid-width location of the continuous track with respect to the width axis 158. The spacing between the drive beams 188 and the track gaps 220 can correspond to the radial spacing of the drive teeth 144 disposed around the drive sprocket 142. Accordingly, the drive teeth 144 can be individually received into the correspondingly spaced track gaps 220 and penetrate between adjacent track links 122 as the drive sprocket 142 rolls with respect to the continuous track 120. Rotation of the drive sprocket 142 causes the teeth 144 to push against the drive beams 188, therefore propelling the machine with respect to the continuous track. The unobstructed penetration of the teeth 144 with respect to the track gaps 220 can provide a sufficient depth of engagement of the teeth into the continuous track 120 to further facilitate force transfer between the components. The rail protrusions 192 rising along the sprocket lugs 190 on either side of the drive beam 188 assist in centering and guiding the teeth 144 into the track gaps 220. Further, the circumference of the drive sprocket 142 rolling along the rail protrusions 192 may roll above and over the drive beam 188 disposed below the rail protrusions.

In addition to the drive sprocket, the contoured upper surface can facilitate rolling contact with the rollers of the track frame. Referring to FIG. 4, the alignment of the roller lugs 200 of the first array 170 and the alignment of the roller lugs 200 of the second array 172 forms parallel, spaced apart, first and second roller tracks or first and second roller paths 232, 234 that are spaced apart towards opposite sides of the track link 122. Further, because of the distance that the roller lugs 200 protrude from the width axis 158, the roller lugs of adjacent tracks may almost abut each other and the first and second roller paths 232, 234 may run in a generally continuous manner along the inner periphery around the loop of the continuous track. The clearances between adjacent roller lugs can be dimensioned so that the adjacent track links and articulate with respect to each other as the continuous track bends around the drive sprocket.

Figure 5:
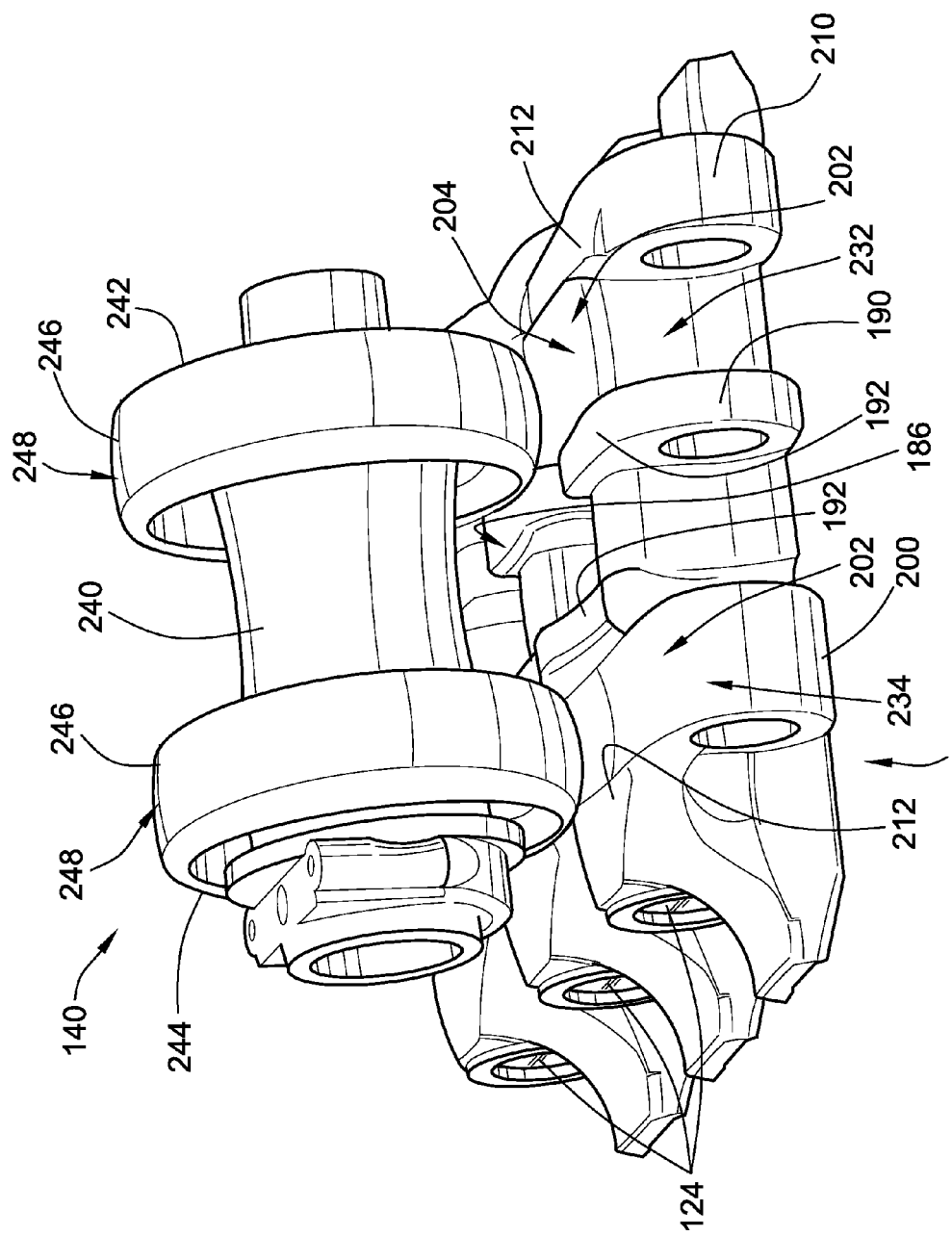
FIG. 5 is a perspective view of a plurality of track links linked together as part of the continuous track and in rolling contact with a roller of the undercarriage assembly.

Referring to FIG. 5, the roller 140 can be a double-wheeled roller in which an axle 240 is connected to and spaces apart a first wheel 242 and a parallel, second wheel 244, both of which have a larger diameter than the narrow axle disposed therebetween. In an embodiment, the double-wheeled roller can be an integral part made of a suitable material such as cast metal. The distance the axle 240 spaces apart the first and second wheels 242, 244 can correspond to the dimension between the first and second roller lugs 200 that are included on a track link 122. Further, the circumferential surfaces 246 of the first and second wheels 242, 244 can have a rounded or radiused profile 248, perpendicular to the access of rotation of the roller 140. The radiused profile 248 corresponds to the curvature or arcuate shape 204 of the roller troughs 202 formed along the top surface of the roller lugs 200 and that define the continuous first and second roller paths 232, 234. Hence, when the roller 140 is in rolling contact with the plurality joined track links 122, the first wheel 242 aligns with the first roller path 232 and the second wheel 244 aligns with the second roller path 234. As indicated above, dividing the load from the machine between two roller wheels 242, 244 in rolling contact with the first and second roller paths 232, 234 that extend generally continuously about the loop of the continuous track improves weight distribution from the machine through the track, which can improve traction control and component life.

Further, because of the correspondence between the radiused profile 248 of the first and second wheels 242, 244 and the curvature or arcuate shape 204 of the roller troughs 202, the circumferential surfaces 246 of the first and second wheels makes a high degree of contact with the first and second roller paths 232, 234. In other words, the first and second wheels 242, 244 and the first and second roller paths 232, 234 are in contact across their curved profiles both radially and laterally toward the side of the wheel and path for better weight distribution with respect to a single radial point of contact between the wheel and the roller path. The curve-to-curve contact between the wheel and roller path may result in reduced wear, or a more uniform wear, between the parts. In addition, the rail protrusion 192 on the sprocket lug 190 and the corresponding shoulder protrusion 212 on the side lug 210, which generally extend above the roller troughs 202, ensure the troughs are partially recessed with respect to the contoured upper surface 186. Hence, the first and second wheels 242, 244 are set well within and ride in the recessed first and second roller paths 232, 234, respectively, and are guided by the rail protrusion 192 and the shoulder protrusion 212 on either side of the respective wheel. This configuration helps resist side-to-side motion or relative lateral displacement of the roller 140 from the continuous track and prevent slippage or derailment of the track.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A track link comprising
   a link body extending between a first body side and a second body side thereby delineating a width axis, the link body including:
   a drive beam disposed mid-width along the width axis;
   a plurality of pin lugs each including a root aligned along the width axis and a pin bore offset with respect to the width axis, the plurality of pin lugs including:
   a pair of sprocket lugs disposed on either side of the drive beam, each of the pair of sprocket lugs extending perpendicularly in opposite directions from the width axis, each of the pair of sprocket lugs including a rail protrusion projecting above the drive beam;
   a pair of roller lugs disposed to either side of the pair of sprocket lugs, the pair of roller lugs extending perpendicularly in opposite directions from the width axis, the pair of roller lugs each including a roller trough disposed below the rail protrusion of the respective sprocket lug; and
   a pair of side lugs disposed to either side of the pair of roller lugs, the pair of side lugs extending perpendicularly in opposite directions from the width axis to the pin bore; and
   a shoe portion extending across the link body.

2. The track link of claim 1, wherein the shoe portion delineates a planar lower surface and the link body delineates a contoured upper surface opposite the planar lower surface.

3. The track link of claim 2, wherein the rail protrusion curves upwards from the root to a crest approximately above the pin bore.

4. The track link of claim 2, wherein the roller trough extends between a sprocket lug of the pair of sprocket lugs and a side lug of the pair of side lugs.

5. The track link of claim 4, wherein the roller trough has an arcuate shape between the sprocket lug and the side lug and extends from the root to approximately above the pin bore.

6. The track link of claim 2, wherein each of the pair of side lugs include a shoulder protrusion corresponding to the contoured upper surface, the shoulder protrusion extending from the root to approximately above the pin bore.

7. The track link of claim 6, wherein the shoulder protrusion includes a narrow shoulder width proximate the root that expands to a large shoulder width approximately above the pin bore.

8. The track link of claim 1, wherein the pair of sprocket lugs are joined at the root to the drive beam; the pair of roller lugs are joined at the root to a respective one of the pair of sprocket lugs; and the pair of side lugs are joined at the root to a respective one of the pair of roller lugs.

9. The track link of claim 8, wherein the pair of side lugs corresponding respectively to one of the first body side and the second body side of the link body.

10. The track link of claim 1, wherein one of each of the pair of sprocket lugs, one of each of the pair of roller lugs, and one of each of the pair of side lugs is arranged as part of a first array, and another one of each of the pair of sprocket lugs, one of each of the pair of roller lugs, and one of each of the pair of side lugs is arranged as part of a second array.

11. The track link of claim 10, wherein the pin bores corresponding to the first array are aligned along a first array axis and the pin bores corresponding to the second array are aligned along a second array axis, the first array axis and the second array axis being parallel to the width axis.

12. An undercarriage assembly for a mobile machine comprising:
   a track frame delineating a frame length extending between a first frame end and a second frame end;
   a drive sprocket operatively coupled to a power source and rotatably supported by the track frame proximate the first frame end;
   a plurality of rollers rotatably supported by the track frame and spaced apart between the first frame end and the second frame end;
   a continuous track including a plurality of track links linked together, each of the plurality of track links including a link body extending between a first body side and a second body side over a shoe portion, the link body having:
   a drive beam disposed mid-width between the first body side and the second body side and adapted to engage the drive sprocket;
   a pair of sprocket lugs disposed to either side of the drive beam, each of the pair of sprocket lugs including a rail protrusion projecting above the drive beam, the sprocket lugs adapted to make rolling contact with the drive sprocket;
   a pair of roller lugs disposed to either side of the pair of sprocket lugs, each of the pair of roller lugs including a roller trough disposed below the rail protrusion of the respective sprocket lug and adapted to make rolling contact with the plurality of rollers;
   a pair of side lugs disposed to either side of the pair of roller lugs, each of the pair of side lugs including a shoulder protrusion protruding above the roller trough.

13. The undercarriage assembly of claim 12, wherein, when the plurality of track links are linked together, the rail protrusion of each of the pair of sprocket lugs for each of the plurality of track links align to provide a first rail row and a second rail row that are parallel to each other and that extend along a continuous length of the continuous track.

14. The undercarriage assembly of claim 12, wherein, when the plurality of track links are linked together, the roller trough of each of the pair of roller lugs for each of the plurality of track links align to provide a first roller path and a second roller path that are parallel to each other and that extend along a continuous length of the continuous track.

15. The undercarriage assembly of claim 14, wherein each of the plurality of rollers includes a first wheel and a second wheel, the first wheel and the second wheel parallel and spaced apart from each other.

16. The undercarriage assembly of claim 12, wherein each of the pair of sprocket lugs, each of the pair of roller lugs, and each of the pair of side lugs includes a pin bore disposed therein.

17. The undercarriage assembly of claim 16, wherein each of the pair of sprocket lugs, the pair of roller lugs and the pair of side lugs are connected together by a contiguous spine, and each pin bore is offset from the contiguous spine.

18. The undercarriage assembly of claim 17, wherein
each of the pair of sprocket lugs projects from the contiguous spine in opposite directions,
each of the pair of roller lugs projects from the contiguous spine in opposite directions, and
each of the pair of side lugs projects from the contiguous spine in opposite directions.

19. The undercarriage assembly of claim 12, further comprising an idler supported to rotate by the track frame proximate the second frame end and the pair of sprocket lugs are adapted to make rolling contact with the idler.

20. A method of operating a continuous track including a plurality of track lurks, the plurality of track links each including a drive beam, a pair of sprocket lugs, a pair of roller lugs, and a pair of side lugs, the method comprising:
disposing the continuous track about a track frame having a double-wheeled roller with a first wheel and a second wheel and a drive sprocket with a plurality of teeth;
rotating the drive sprocket to urge one of the plurality of teeth against the drive beam;
rolling the drive sprocket along a rail protrusion protruding from each of the pair of sprocket lugs above the drive beam;
rolling the double-wheeled roller along a first roller path and a second roller path corresponding to the pair of roller lugs, the roller lugs each including a roller trough disposed below the rail protrusion of the respective sprocket lug to define the first and second roller paths; and
aligning the double-wheeled roller and the continuous track by disposing the first wheel of the double-wheeled roller between the rail protrusion protruding from one of the pair of sprocket lugs and a shoulder protrusion protruding from one of the pair of side lugs, and disposing the second wheel between the rail protrusion protruding from another of the pair of sprocket lug and a shoulder protrusion protruding from another of the pair of side lugs.

* * * * *